R. Fanning,
Drag Saw.
Nº 41,210.  Patented Jan. 12, 1864.
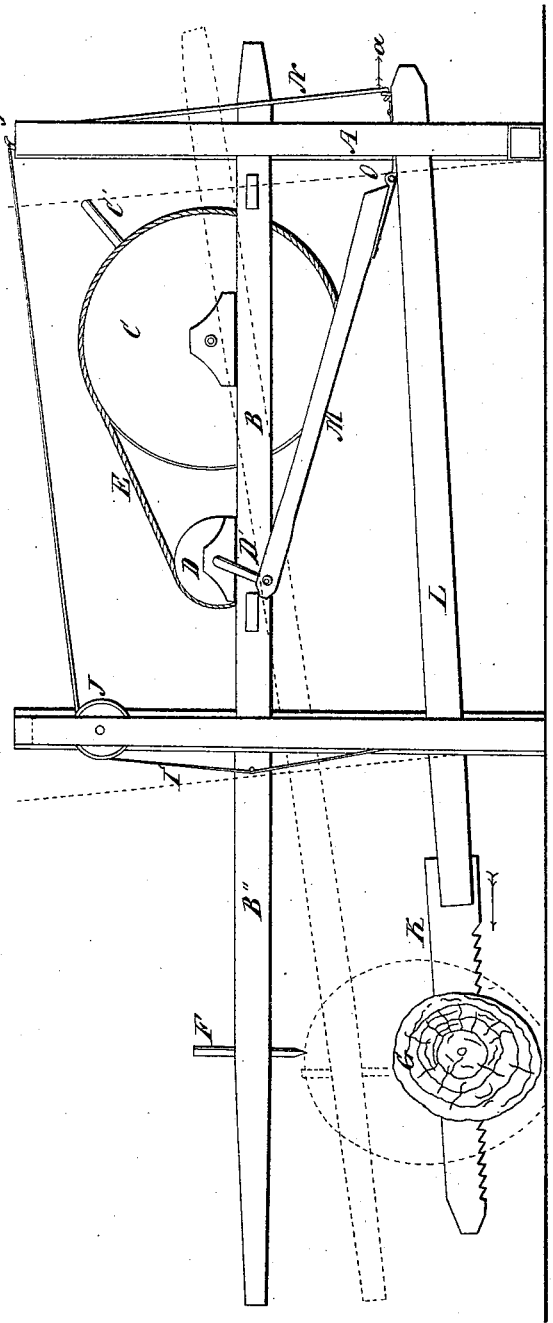
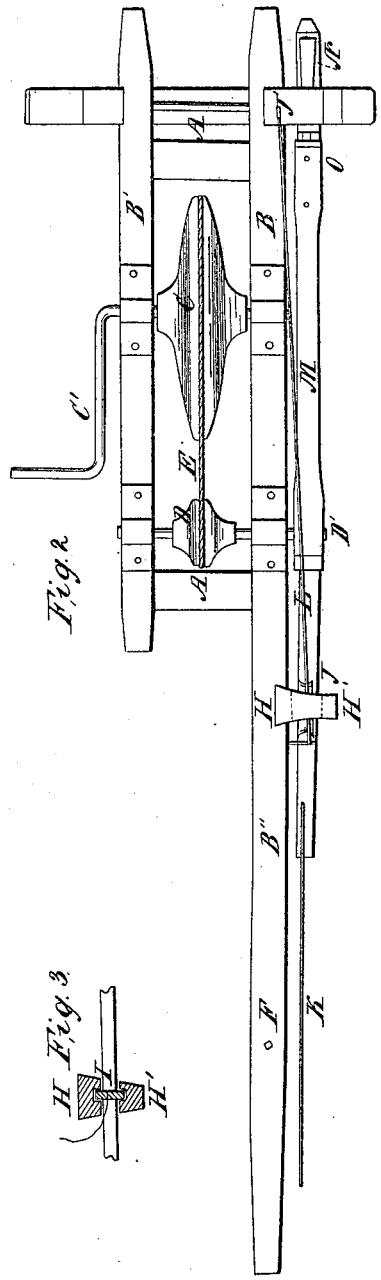
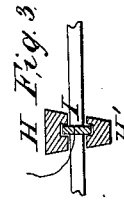
Witnesses

UNITED STATES PATENT OFFICE.

R. FANNING, OF CLARKSFIELD, OHIO.

IMPROVEMENT IN SAWING-MACHINES.

Specification forming part of Letters Patent No. 41,210, dated January 12, 1864.

*To all whom it may concern:*

Be it known that I, R. FANNING, of Clarksfield, in the county of Huron and State of Ohio, have invented new and useful Improvements in Sawing-Machines; and I do hereby declare that the following is a full and complete description of the construction and operation of the same, reference being had to the accompanying drawings, making part of this specification, in which—

Figure 1 is a side view, and Fig. 2 is a top view.

Like letters refer to like parts.

My invention relates to the general structure of the machine, to the arrangement of the several parts, and to its self-adjusting properties to any size of log.

The main frame of the machine is shown at A A and B B'. That portion of the frame that carries the driving-wheel and crank-pulley is indicated at B B'. The driving-wheel is shown at C, and is propelled by a crank, C'. The crank-pulley that drives the saw is shown at D, and its crank is shown at D'. A belt or band, E, passes around the driving-wheel C and crank-wheel D, thus giving motion to the latter. The beam B extends forward from the frame, as shown at B'', some four or five feet, and is provided with a spike, F, which is driven into the top of the log to be sawed, for the purpose of keeping the frame steady. This timber or beam B B'', together with the whole frame, adjusts itself to the size of the log G, as indicated by the dotted lines in Fig. 1.

H H' represent standards, which form guides for the pitman of the saw.

The manner of attaching to the beam B'' is shown at H in Fig. 2 by means of a dovetailing notch in the beam and corresponding acute angles in the post H. Consequently the beam is capable of a vertical adjustment to accommodate the different sizes of the logs to be sawed. The two inner faces of these guides are grooved, as shown in cross-section, Fig. 3, in which slides a stirrup, I, for raising the saw from the log by means of the cord I', which passes over the pulley J, and is attached to the top of the frame, as seen at J'. The saw is represented at K, the teeth of which hook backward or toward the heel of the saw, so that the cut is toward the frame. In other words, it is a drawing cut, which gives steadiness to the saw. The connecting rod is represented at M, one end of which connects with the crank D', while the other end is hinged to the heel end of the pitman, as shown at o. A spring, N, is attached to the frame, as seen in Fig. 1, the tension of which is in the direction of the arrow *a*, with strength sufficient to overcome about half the resistance arising from the cut of the saw. Consequently, when the saw moves in the direction of the arrow *b* (the teeth offering no resistance) the propelling power of the machine compresses the spring, which in turn reacts upon the saw in making the cut, and thus the propelling power is distributed uniformly through the whole rotation of the pulley D, the force of the spring acting in concert with the power applied to the crank.

What I claim as my improvement, and desire to secure by Letters Patent, is—

The self-adjusting frame A B B', beam B'', and spike F, in combination with the spring N and saw K, the several parts being constructed, arranged, and operated as and for the purpose set forth.

R. FANNING.

Witnesses:
   W. H. BURRIDGE,
   A. W. MCCLELLAND.